US011112492B2

(12) United States Patent
Utermoehlen et al.

(10) Patent No.: US 11,112,492 B2
(45) Date of Patent: Sep. 7, 2021

(54) ROTATION ANGLE SENSOR SYSTEM, LIDAR SYSTEM, WORK DEVICE AND OPERATING METHOD FOR A LIDAR SYSTEM

(71) Applicant: Robert Bosch GmbH, Stuttgart (DE)

(72) Inventors: Fabian Utermoehlen, Leonberg (DE); Stefan Leidich, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 545 days.

(21) Appl. No.: 16/025,443

(22) Filed: Jul. 2, 2018

(65) Prior Publication Data
US 2019/0011537 A1    Jan. 10, 2019

(30) Foreign Application Priority Data
Jul. 6, 2017   (DE) .......................... 102017211491.6

(51) Int. Cl.
| | |
|---|---|
| *G01D 5/14* | (2006.01) |
| *G01D 5/20* | (2006.01) |
| *G01S 7/481* | (2006.01) |
| *G01S 17/89* | (2020.01) |
| *G01S 17/931* | (2020.01) |

(52) U.S. Cl.
CPC ............ *G01S 7/4817* (2013.01); *G01D 5/145* (2013.01); *G01D 5/206* (2013.01); *G01D 5/2053* (2013.01); *G01D 5/2073* (2013.01); *G01S 17/89* (2013.01); *G01S 17/931* (2020.01)

(58) Field of Classification Search
CPC ..... G01S 7/4817; G01D 5/145; G01D 5/2053
See application file for complete search history.

(56) References Cited

U.S. PATENT DOCUMENTS

| | | | | |
|---|---|---|---|---|
| 7,834,618 | B2 * | 11/2010 | Moura .................. | G01D 5/145 |
| | | | | 324/207.26 |
| 9,059,649 | B1 | 6/2015 | Droz et al. | |
| 9,628,170 | B1 | 4/2017 | Rosenband et al. | |
| 10,816,318 | B2 * | 10/2020 | Vandersteegen ......... | G01B 7/30 |

(Continued)

FOREIGN PATENT DOCUMENTS

| | | |
|---|---|---|
| CN | 1657878 A | 8/2005 |
| CN | 104567651 A | 4/2015 |

(Continued)

*Primary Examiner* — Reena Aurora
(74) *Attorney, Agent, or Firm* — Norton Rose Fulbright US LLP; Elizabeth Tretter (57) ABSTRACT

A rotation angle sensor system for an optical system and/or a LIDAR system having a rotor and a stator for determining a rotation angle and/or an orientation between the rotor and the stator, which has a coil system that is stator-based and rotatably fixedly attached or attachable to the stator as a sensor element for receiving a magnetic alternating field, and, having a target that is rotor-based and rotatably fixedly attached or attachable to the rotor for generating a magnetic alternating field, and in which the coil system and the target are attached or are attachable to the stator and to the rotor so that different overlaps and/or spatial proximities occur between the coil system and the target as a function of the rotation angle and/or of the orientation between stator and rotor with a correspondingly different influence of the magnetic alternating field of the target on the coil system.

14 Claims, 7 Drawing Sheets

(56) References Cited

U.S. PATENT DOCUMENTS

| | | | | |
|---|---|---|---|---|
| 2016/0116304 A1* | 4/2016 | Iwamoto | ............... | G01D 5/145 |
| | | | | 324/207.25 |
| 2018/0123412 A1* | 5/2018 | Karplus | ............... | H02K 1/2793 |
| 2019/0011285 A1* | 1/2019 | Utermoehlen | ......... | G01D 5/145 |

FOREIGN PATENT DOCUMENTS

| CN | 105164501 A | 12/2015 |
|---|---|---|
| CN | 105393090 A | 3/2016 |
| CN | 106461782 A | 2/2017 |
| CN | 106796118 A | 5/2017 |
| CN | 106796119 A | 5/2017 |
| CN | 106796120 A | 5/2017 |
| CN | 106871937 A | 6/2017 |
| DE | 102015220615 A1 | 4/2017 |
| DE | 102015220617 A1 | 4/2017 |
| DE | 102015220624 A1 | 4/2017 |
| DE | 102016202867 B3 | 4/2017 |

\* cited by examiner

Fig. 8

US 11,112,492 B2

ROTATION ANGLE SENSOR SYSTEM, LIDAR SYSTEM, WORK DEVICE AND OPERATING METHOD FOR A LIDAR SYSTEM

RELATED APPLICATION INFORMATION

The present application claims priority to and the benefit of German patent application no. 10 2017 211 491.6, which was filed in Germany on Jul. 6, 2017, the disclosure which is incorporated herein by reference.

FIELD OF THE INVENTION

The present invention relates to a rotation angle sensor system for an optical system that includes a rotor and a stator, and in particular for a LIDAR system, a LIDAR system per se, and a work device and in particular a vehicle.

BACKGROUND INFORMATION

In the use of work devices, vehicles, and other machines and equipment, operating assistance systems or sensor systems are increasingly being used for detecting the operating environment. In addition to radar-based systems or systems based on ultrasound, light-based detection systems such as so-called light detection and ranging (LIDAR) systems are also used.

For sampling or scanning LIDAR systems, primary light after being generated is led across a visual field to be detected. So-called macroscanners that include a rotor and a stator are used. The rotor accommodates at least a portion of the optical system, the sensor system, and the light sources, and is controllably rotatable relative to the stator with the aid of a drive. All components of the rotor may be supplied with energy wirelessly, starting from the stator. For the commutation of the drive and for the image reconstruction, information concerning the orientation of the rotor with respect to the stator and concerning its development over time are necessarily required for operating parameters to be determined, which thus far have had to be detected using a plurality of sensors.

SUMMARY OF THE INVENTION

The rotation angle sensor system according to the present invention having the features described herein has the advantage over the related art that with a comparably simple arrangement, the orientation of a rotor with respect to a stator is reliably ascertainable at any time, even at the start of operation as an initial condition. This is achieved according to the present invention with the features described herein, in that a rotation angle sensor system for an optical system that includes a rotor and a stator, and in particular for a LIDAR system, for determining a rotation angle and/or an orientation between the rotor and the stator is provided, which is configured (i) with a stator-based coil system, having an inductance (L), that is rotatably fixedly mounted or mountable on the stator as a sensor element for generating and transmitting a magnetic alternating field, in particular by active energization, and (ii) with a rotor-based target that functions as an eddy current element and is rotatably fixedly mounted or mountable on the rotor for receiving the magnetic alternating field and for generating a magnetic eddy current field, the coil system and the target being mounted or mountable on the stator and on the rotor, respectively, in such a way that different overlaps and/or spatial proximities between the coil system and the target, with a correspondingly different effect on the magnetic alternating field of the coil system, result as a function of the rotation angle and/or of the orientation between the stator and the rotor. The rotation angle and/or the orientation between the stator and the rotor may be deduced, based on the differing effect on the magnetic alternating field of the coil system, by measuring same.

The further descriptions herein set forth further refinements of the present invention.

In one advantageous refinement of the present invention, the rotation angle sensor system is configured to—in particular, actively—energize the target for actively generating a magnetic alternating field. As a result of this measure, the necessity, for example, of providing a field coil or the like in the area of the stator is eliminated. In addition, higher magnetic field strengths are producible as a result of the active energization. This opens up the possibility of greater distances between the target and the sensor element in the form of the coil system.

In addition or alternatively, a—in particular, first—voltage source for—in particular, actively—supplying power to the target, may be configured, for example, including or in the manner of an—in particular, first—adaptation network or adaptation component, which may include or in the manner of a capacitor connected in parallel, short-circuiting in a frequency range of approximately 5 MHz to approximately 20 MHz, further may include an impedance at approximately 1 MHz of approximately 1 Ohm, a capacitance of 15 nF and/or for adapting frequency, amplitude and/or phase of an input signal.

Furthermore, the target may, in addition or alternatively, be configured connected to or connectable to such a voltage source and, in addition, the rotation angle sensor system according to the present invention may include, in particular, a corresponding connecting device.

In another embodiment of the rotation angle sensor system according to the present invention, the coil system for the sensor element or of the sensor element includes at least one coil element as a receiving coil.

In this case, it is particularly advantageous if individually or in arbitrary combination with one another
  a respective coil element is configured as a planar coil,
  a respective coil element has a shape in cross section or in a plane of a coil winding that includes an even number of identical partial windings or partial turns adjacent to one another with directly adjacent partial windings or partial turns extending in the opposite direction,
  a respective coil element includes first and second terminals,
  the coil system includes a plurality of—in particular identically configured coil elements that are connected in series, rotated toward one another and/or uniformly cover a full angle, and/or
  the coil system for the sensor element is mirror-symmetrically and/or rotationally symmetrically configured with respect to a rotational axis between stator and rotor.

These measures, individually or in arbitrary combination with one another, improve the sensitivity and the resolution capacity of the rotation angle sensor system provided according to the present invention.

A particularly compact rotation angle sensor system according to the present invention and with further increased measuring sensitivity results if, according to another refinement of the concept according to the present invention, the target is configured in the manner of an, in particular, planar transmitter coil including terminals and including one or multiple windings and/or one or multiple turns, in particular, in a plane parallel to a plane defined by the coil element of the coil system of the receiver coil.

In addition or alternatively, one embodiment may be provided in the manner of a short circuit ring. This short circuit ring has a particularly simple structure with a correspondingly simplified field pattern.

Various additional embodiments are advantageously provided in conjunction with the technical measures just discussed.

Thus, the target may include an equal number of first sections and of second sections, each of which are configured to be identical to each other, overall identical, in an alternating sequence and/or uniformly covering a full angle, in particular, with respect to an underlying rotational axis between stator and rotor.

A respective first section of the target may be configured for a current flow at a greater distance and/or along a larger radius with respect to a rotational axis between stator and rotor.

A respective second section of the target may be configured for a current flow at a smaller distance and/or along a smaller radius with respect to the rotational axis.

A respective first section of the target and a respective second section of the target in this case may be electrically connected on the input side and on the output side to second sections or first sections preceding and following in the circumferential direction—relative to a rotational axis between stator and rotor—with the aid of connecting sections, these connecting sections connecting consecutive radially extending or essentially radially extending first and second sections for a radial current flow in the circumferential direction.

The target may be mirror-symmetrically and/or rotationally symmetrically configured with respect to a rotational axis or the rotational axis between stator and rotor.

The compactness of the design of the rotation angle sensor system according to the present invention and the sensitivity of the verification by the rotation angle sensor system according to the present invention may be further enhanced by designing the coil system of the sensor element and the target to be attached or to be attachable to the stator or to the rotor in such a way that the coil system and the target are situated in planes in parallel to one another and/or are situated a minimal distance apart from one another, which may be at a distance of less than 5 mm, which may be at a distance of less than 2 mm and further may be at a distance of under 1 mm.

Additional savings in installation space may be achieved if, according to another advantageous refinement of the rotation angle sensor system according to the present invention, the coil system for the sensor element is configured as a circuit board structure or as part of a circuit board structure on the stator side, and/or the target is configured as a circuit board structure or as part of a circuit board structure on the rotor side.

The present invention further relates to a LIDAR system for visually detecting a visual field, in particular for a work device and/or for a vehicle, which is configured with a rotor, a stator, a unit, in particular, a drive for rotating the rotor relative to the stator about a rotational axis, and with a rotation angle sensor system configured according to the present invention for determining a rotation angle and/or an orientation between the rotor and the stator.

The coil system is rotatably fixedly attached to the stator. The target is rotatably fixedly attached to the rotor.

The rotor and, in particular, a transmitter optical system encompassed by the rotor that includes a light source unit and/or a receiver optical system that includes a detector system is/are configured for wirelessly supplying power, in particular, with the aid of induction.

In addition, the stator includes a primary coil configured for generating and emitting a magnetic alternating field. The rotor includes a magnetically coupled secondary coil configured for receiving the magnetic alternating field of the primary coil and for generating an induction voltage as an operating voltage, the primary coil and the secondary coil being magnetically coupled to one another, in particular, each magnetically coupled to and/or via a ferrite element or via a ferrite core.

For a particularly compact design, respectively provided ferrite elements or ferrite cores may be geometrically and/or materially configured or are to be geometrically and/or materially configured accordingly.

Thus, it is provided in a particularly advantageous refinement of the LIDAR system according to the present invention that a ferrite element of the primary coil on the stator side is formed below the coil system for the sensor element, or the primary coil on the stator side and/or its carrier is/are configured to be partially perforated and/or at least partially enclose a ferrite element of the primary coil on the stator side.

In addition or alternatively, the ferrite element of the secondary coil on the rotor side may be structured to accommodate the target in a recess and/or to include a materially modified area as a target, in particular, in the form of an implantation and/or a coating.

In another additional or alternative embodiment of the present invention, the rotor in the rotation angle sensor system is configured with a first voltage source for supplying power to the target, in particular, including or in the manner of an in particular, first—adaptation network or adaptation component, which may include or in the manner of a capacitor connected in parallel, short-circuiting in a frequency range of approximately 5 MHz to approximately 20 MHz, having an impedance at approximately 1 MHz of approximately 1 Ohm, a capacitance of 15 nF and/or for adapting frequency, amplitude and/or phase of an input signal and/or electromagnetically coupled to the secondary coil on the rotor side for supplying power.

In addition or alternatively, the rotor in the rotation angle sensor system may include a second voltage source for supplying power to the rotor and, in particular, to a drive of the rotor, to a transmitter optical system encompassed by the rotor that has a light source unit and/or to a receiver optical system that has a detector system, in particular, including or in the manner of a rectifier and/or including a second adaptation network, in particular, in the form of or in the manner of a smoothing capacitor, which may have a capacitance in the range of 1 μF to 100 μF, and/or electromagnetically coupled to the secondary coil on the rotor side for supplying power.

In addition or alternatively, a generator may be configured, in particular, together with an adaptation diplexer, for supplying power and, in particular, for feeding the primary coil in the stator, and/or for generating and supplying a feed signal of a first component of a supply signal in the range of approximately 10 kHz to 500 kHz for supplying additional components of the rotor besides the target and (ii) of a second component of the supply signal in the range of approximately 5 MHz to approximately 20 MHz for supplying the target.

In addition, the present invention also relates to a work device and, in particular, to a vehicle, which are configured with a LIDAR system according to the present invention and for visually detecting a visual field.

According to another aspect of the present invention, an operating method for a LIDAR system according to the present invention is also provided, in which a supply signal (i) wirelessly received in the rotor on the one hand is converted into amplitude, frequency and/or phase using a converter or another device, in order to operate the target of the rotation angle sensor and, in particular, to excite the transmitter coils of the target, and/or (ii) on the other hand, is converted using a rectifier, including a second adaptation network, in particular, in the form of or in the manner of a smoothing capacitor, which may have a capacitance in the range of 1 µF to 100 µF and/or of another device, in order to operate additional components of the LIDAR system in the rotor, in particular, a drive of the rotor, a transmitter optical system encompassed by the rotor that includes a light source unit and/or a receiver optical system that includes a detector system.

In one refinement of the operating method according to the present invention, the supply signal (i) having a first component in the range of approximately 10 kHz to 500 kHz for supplying additional components of the rotor besides the target and/or (ii) having a second component in the range of approximately 5 MHz to approximately 20 MHz for supplying the target, is generated for supplying power and, in particular, for feeding the primary coil, and is fed, in particular, via a generator and, in particular, together with an adaptation diplexer in the stator.

Specific embodiments of the present invention are described in detail with reference to the appended drawings.

DETAILED DESCRIPTION

Exemplary embodiments of the present invention and the technical background are described in detail below with reference to FIGS. 1 through 8. Identical and equivalent elements as well as identically or equivalently functioning elements and components are identified with the same reference numerals. The detailed description of the identified elements and components will not be rendered each time they appear.

The features and additional properties depicted may be isolated in arbitrary form from one another and may be arbitrarily combined with one another without departing from the core of the present invention.

Figure 1:
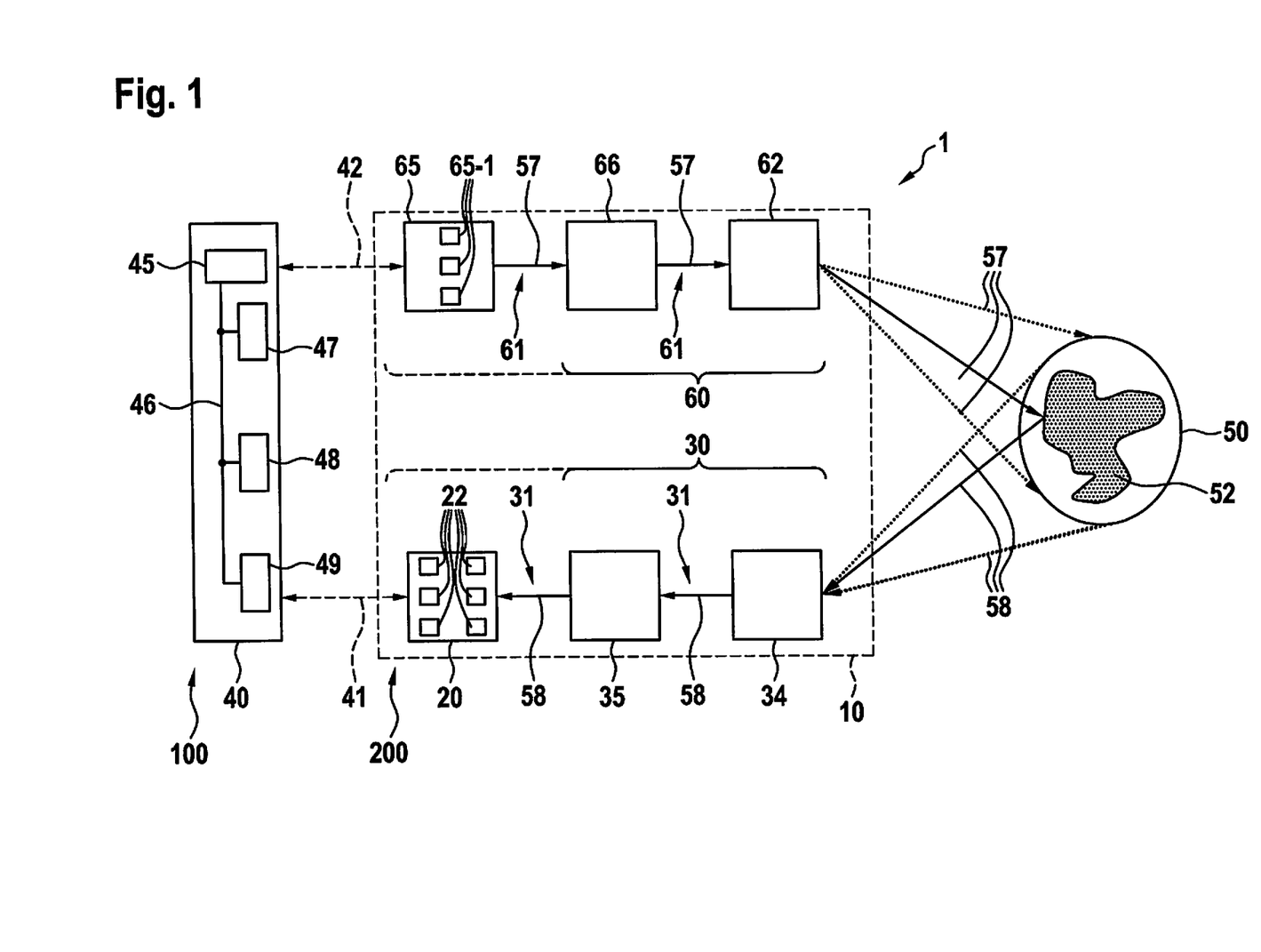
FIG. 1 shows in the manner of a schematic block diagram the structure of a specific embodiment of the LIDAR system according to the present invention.

FIG. 1 shows in the form of a schematic block diagram one specific embodiment of the LIDAR system 1 according to the present invention that includes an optical system 10.

LIDAR system 1 according to FIG. 1 includes a transmitter optical system 60 in its optical system 10 with an optical path 61, which is fed by a light source unit 65 that includes light sources 65-1, for example, here in the form of lasers, and which emits primary light 57—if necessary after passing through beam shaping optical system 66 and via deflection optical system 62—into a visual field 50 for detecting an object 52 of a scene 53 located in the visual field.

In addition, LIDAR system 1 according to FIG. 1 includes a receiver optical system 30 with optical path 31, which receives secondary light 58 reflected by object 52 in visual field 50 via a lens 34 as primary optical system and which transmits it via secondary optical system 35 to a detector system 20 for detection that includes sensor elements or detector elements 22. Secondary optical system 35 may include a bandpass filter in order to reduce the influence of scattered light.

Light source unit 65 including light sources 65-1 and detector system 20 are controlled via control channels 42 and 41 with the aid of a control and evaluation unit 40. Control and evaluation unit 40 may also assume the power transmission and/or data transmission between rotor 200 and stator 100 and, in particular, the control of a rotary drive. However, it is configured, in particular, to carry out the assessment of visual field 50 via control system 45 with connection via bus 46 to transmitting unit 47, receiving unit 49 and correlation unit 48.

It is also apparent from FIG. 1 that control and evaluation unit 40 is configured in conjunction with stator 100, whereas optical system 10 of LIDAR system 1 is accommodated essentially in rotor 200.

The control of the operation of the LIDAR system 1 according to the present invention and the implementation of a corresponding operating method take place using control system 45 depicted in FIG. 1, in which transmitting unit 47, receiving unit 49 and correlation unit 48 are linked to one another via a bus 46 and are operatively connected via control lines 41 and 42 to optical system 10 of LIDAR system 1 in rotor 100 and, in particular, to light source unit 65 and detector system 20 of transmitter optical system 60, or receiver optical system 30.

Figure 2:
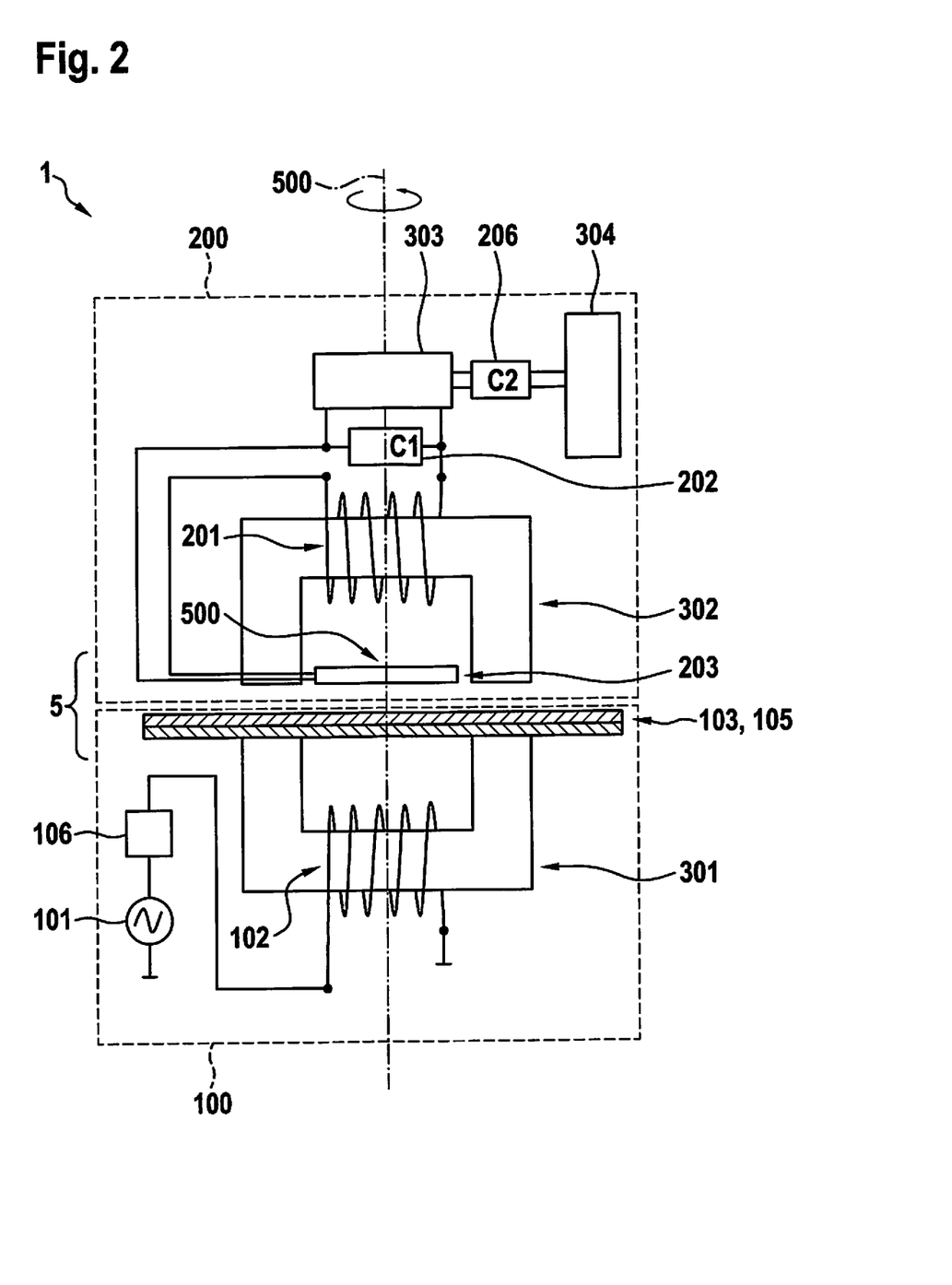
FIG. 2 shows in a schematic and partially sectioned side view details of a specific embodiment of the LIDAR system according to the present invention using a specific embodiment of the rotation angle sensor system according to the present invention.

FIG. 2 shows in a schematic and partially sectioned side view details of a specific embodiment of LIDAR system 1 according to the present invention using a specific embodiment of rotation angle sensor system 5 according to the present invention.

In the specific embodiment according to FIG. 2, stator 100 includes, in addition to primary coil 102 on the stator side and ferrite element or ferrite core 301, a circuit board structure 103 on the stator side, which includes a coil system 105 as a sensor element or for a sensor element in conjunction with the determination of the orientation of the rotation angle of rotor 200 relative to stator 100.

In addition to optical system 10, which includes transmitter optical system 60 and receiver optical system 30 and additional elements 304 of LIDAR system 1, rotor 200 includes a secondary coil 201 having a ferrite element or ferrite core 302, the voltage induced in secondary coil 201 magnetically coupled to primary coil 102 and to ferrite elements 301, 302 being fed on the one hand to a voltage converter 303 and, in particular, to a rectifier, in order to generate an operating voltage for LIDAR components 304. Voltage converter 303 is configured in this case with an adaptation component 206, for example, a smoothing capacitor C2 connected in parallel.

On the other hand, the supply signal is fed from secondary coil 201 to an additional adaptation component 202 in order to provide target 203 including corresponding field coils 204 with an operating voltage for the operation thereof and to thereby effectuate an excitation of target 203. Additional adaptation component 202 may include or may be made up of a capacitance C1 connected in parallel to the inputs of voltage converter 303, which short-circuits the inputs of voltage converter 303 for particular components and/or high-frequency components of the supply signal.

In the specific embodiment according to FIG. 2, circuit board structure 103 including coil system 105 of the sensor element or for the sensor element is formed directly above ferrite element 301 of primary coil 102, target 203 being functionally provided and situated as a controllably operable exciter in close or direct proximity thereto.

Rotor 200 is rotatable relative to stator 100 about a rotational axis 500, a corresponding rotary drive being used, which is not depicted herein.

A generator 101, which applies an AC voltage to primary coil 102 on the stator side, is configured to transmit power from stator 100 to rotor 200 using the arrangement made up of primary coil 102 and secondary coil 201 coupled via ferrite cores 301 and 302. The electromagnetic coupling to rotor 200 then results in a voltage induced in secondary coil 201, which is fed via rectifier 303 to additional components 304 of LIDAR system 1 for the operation thereof and, on the other hand, mediated by converter 202, results in the excitation of target 203.

Figure 7:
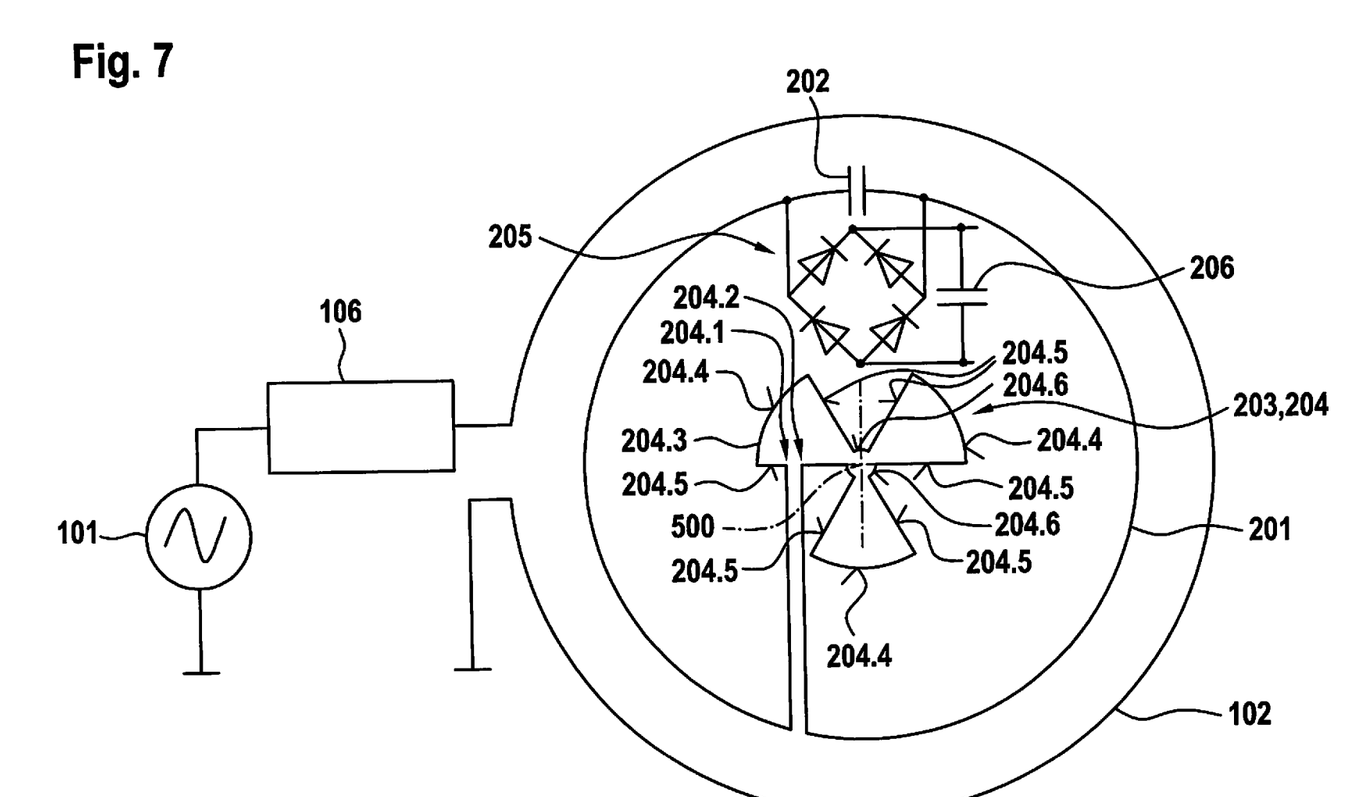
FIGS. 7 and 8 schematically show a top view of specific embodiments of the target usable according to the present invention.

According to one specific embodiment, a supply signal adapted from two superimposed components is fed to primary coil 102 via an adaptation component in the form of an adaptation diplexer or matching diplexer 106, as is also explained in conjunction with FIG. 7.

Figure 3:
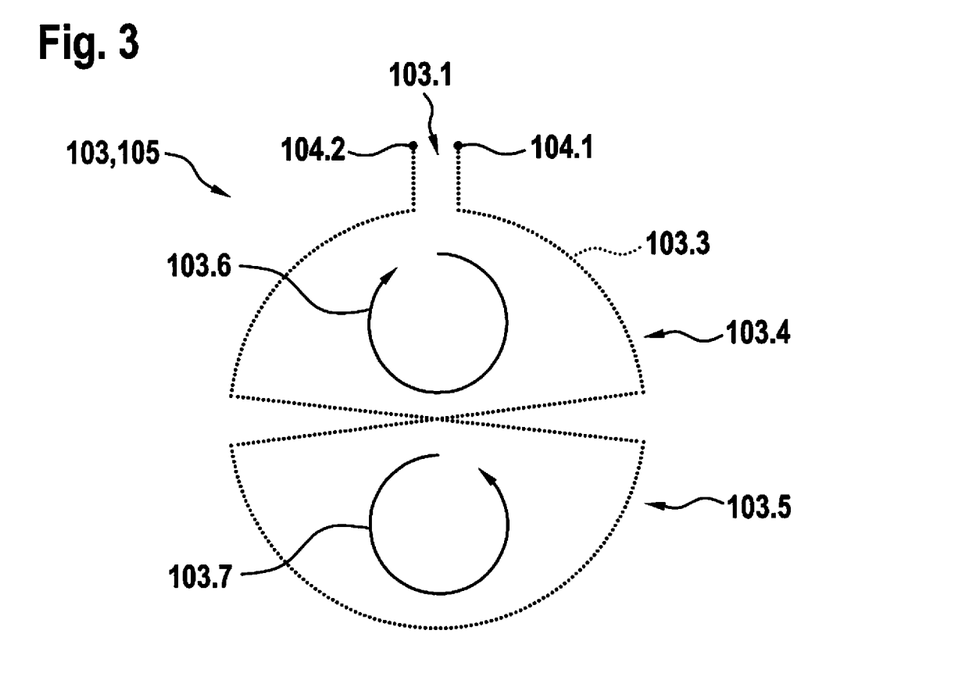
FIGS. 3 and 4 schematically show a top view of specific embodiments of the coil system for a sensor element usable according to the present invention.
Figure 4:
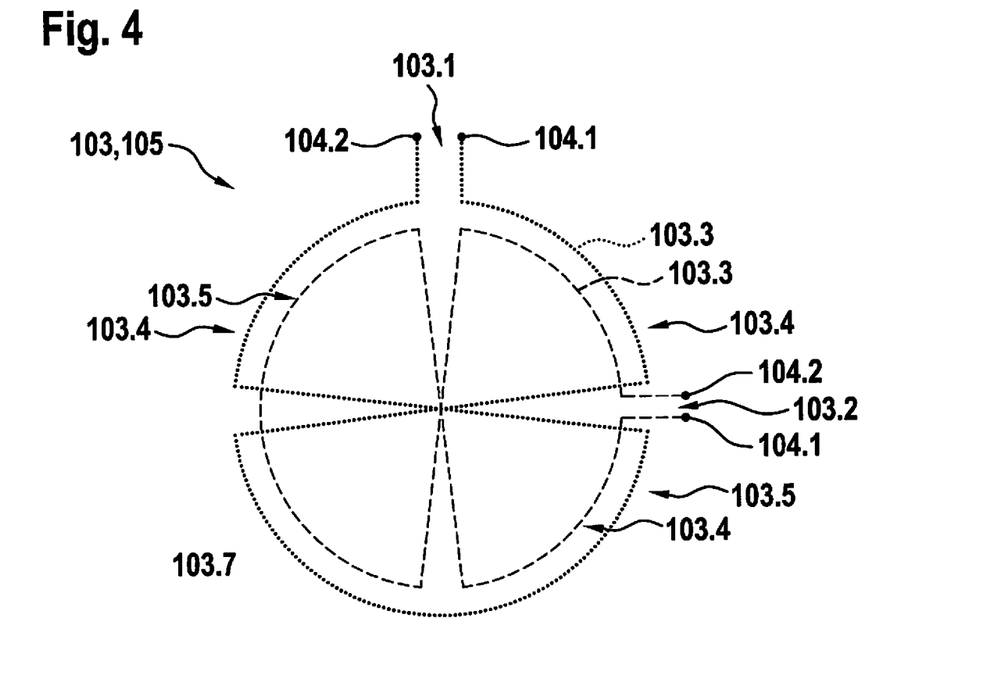

FIGS. 3 and 4 schematically show a top view of specific embodiments of coil system 105 usable according to the present invention as a sensor element or for a sensor element in the area of stator 100.

FIG. 3 shows an example of a specific embodiment of a receiving coil 103.1 usable on the stator side, as it may be configured according to the present invention, for example, as an element of circuit board structure 103 for a coil system 105 as a sensor element.

Receiving coil 103.1 or receiver coil according to FIG. 3 is formed from a winding 103.3 having one or multiple turns. In the specific embodiment depicted in FIG. 3, winding 103.3 of receiver coil 103.1 is formed on the stator side (a) by a first section or a first partial winding 103.4 having a first circumferential direction for the electrical current based on the orientation of first partial winding 103.4 or of the turns thereof, depicted by a first arrow 103.6, and (b) by a second section or by a second partial winding 103.5 having a second circumferential direction for the electric current based on the orientation of second partial windings 103.5 or of the turns thereof, depicted by a second arrow 103.7.

A contacting of receiving coil or receiver coil 103.1 may take place via first terminals 104.1 and 104.2 for contacting winding 103.3.

FIG. 4 shows the structure of a coil system 105 for a sensor element in stator 100, which may be constructed in conjunction with a circuit board structure, having a first receiving coil or receiver coil 103.1 and a second receiving coil or receiver coil 103.2 constructed identically thereto, but which is rotated 90° clockwise relative to first receiver coil 103.1. First and second receiver coils 103.1 and 103.2 of coil system 105 as a sensor element each include a winding 103.1 having a first partial winding 103.4 and a second partial winding 103.5 and first and second terminals 104.1 and 104.2. The properties for each of first and second receiving coils 103.1, 103.2 specified in conjunction with FIG. 3 otherwise apply.

Figure 5:
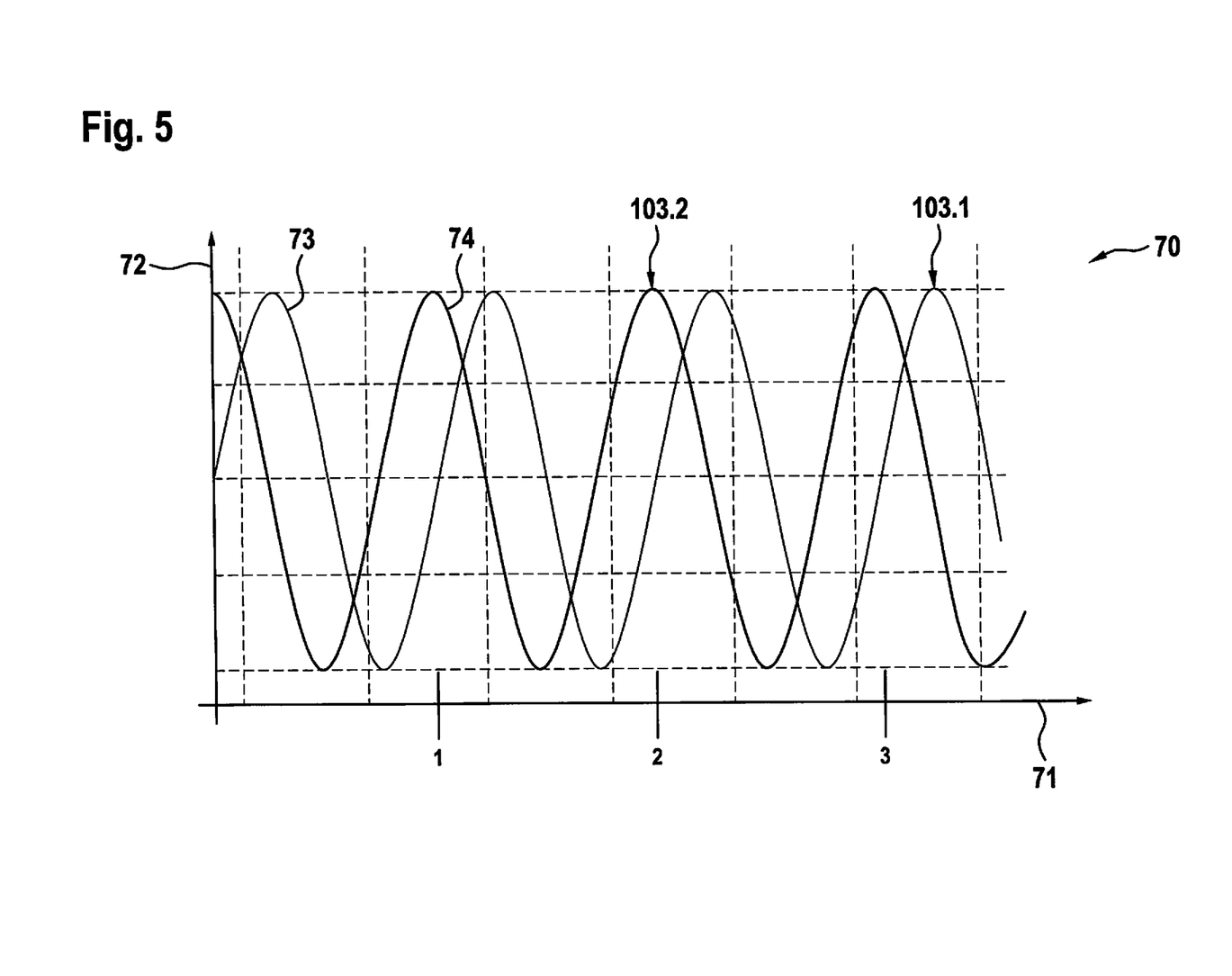
FIG. 5 shows in the form of a graph signals detectable with one specific embodiment of the coil system according to the present invention as a sensor element.

FIG. 5 shows in the form of a graph 70 signals or partial signals detectable with a specific embodiment of coil system 105 according to the present invention as a sensor element, mediated by corresponding sections or partial windings 103.4 and 103.5 of a receiving coil 103.1. According to one embodiment of the present invention, target 203 is constructively and, in particular, geometrically configured in such a way that the signals, induced by induction and received in receiving coils 103.1 and 103.2, and which are plotted in graph 70, in which the time is plotted on the x-axis 71 and the signal strength is plotted on the y-axis 72, as they are depicted in tracks 73 and 74, exhibit a corresponding sinusoidal curve, where applicable, with a corresponding phase shift. The orientation and/or the rotation angle of rotor 200 relative to stator 100 as well as changes thereto may then be inferred by calculation methods carried out accordingly.

Figure 6:
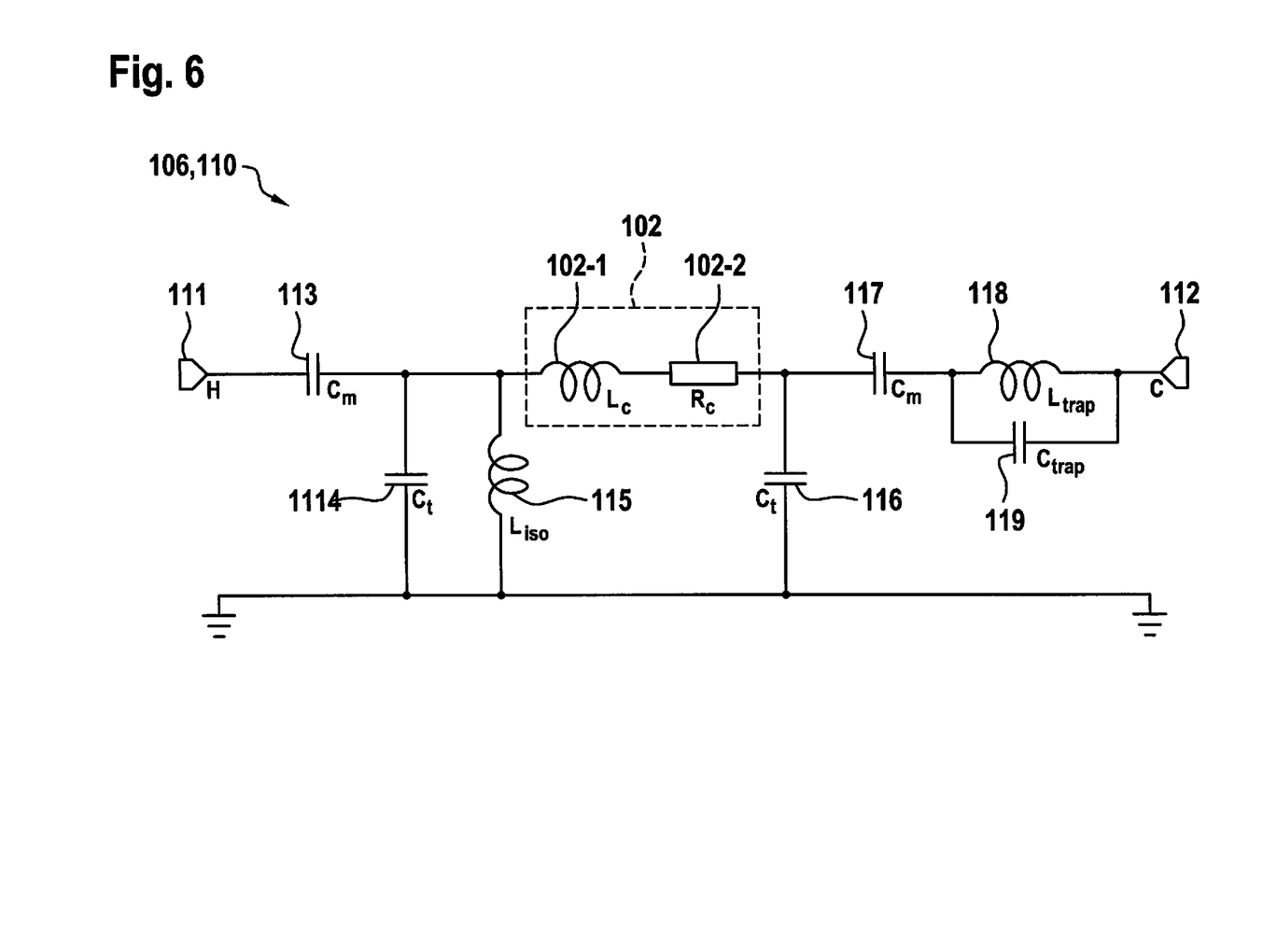
FIG. 6 shows a circuit diagram of one specific embodiment of an adaptation diplexer for building and feeding a supply signal to a primary coil.

FIG. 6 shows a circuit diagram of one specific embodiment of an adaptation diplexer 106 for building and feeding a supply signal to a primary coil 102, which is constructed from a network having capacitances 113, 114, 116, 117, 119 and inductances 115, 118, which are connected to the primary coil in the manner depicted in FIG. 6—represented by inductance 102-1 and resistance 102-2 of the coil—in order to feed an adapted two-component supply signal into primary coil 102 via the terminals or ports 111 and 112.

Figure 8:
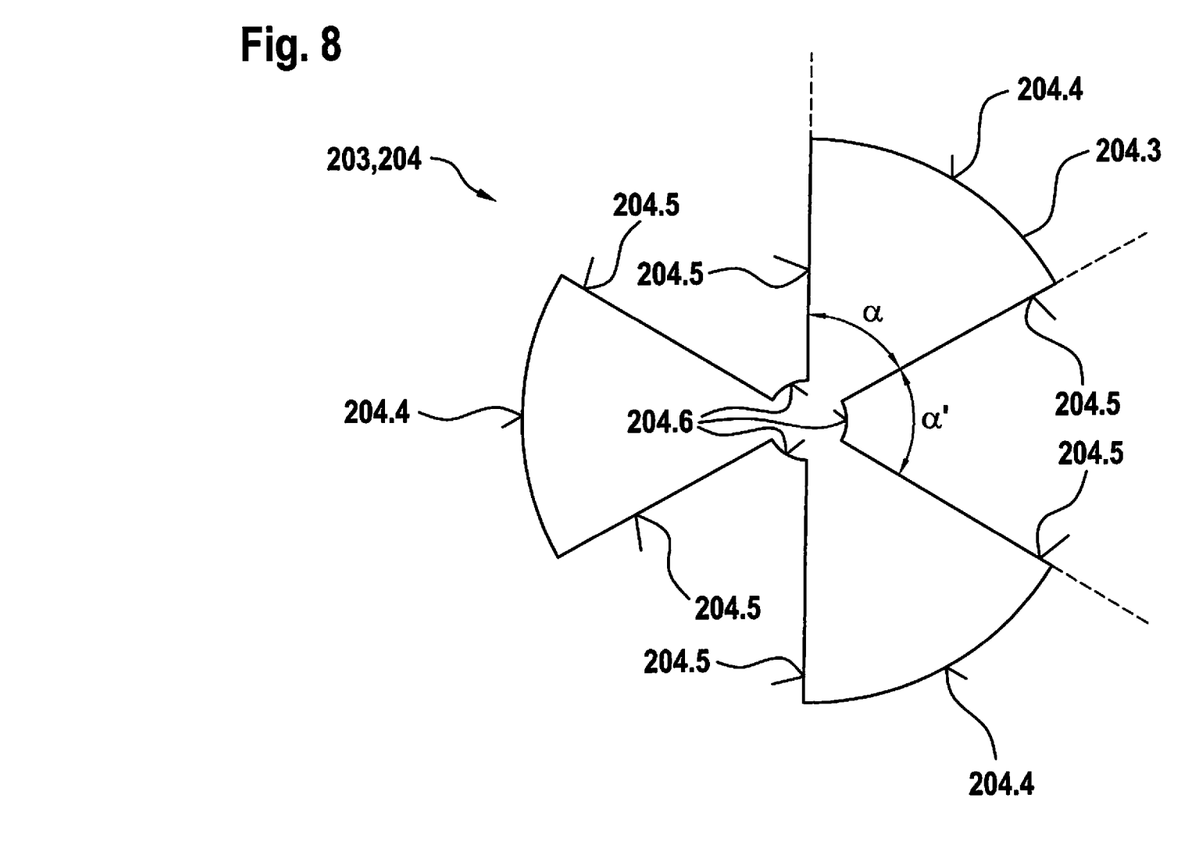

FIGS. 7 and 8 schematically show a top view of specific embodiments of target 203 usable according to the present invention.

Target 203 is depicted in FIG. 7 as a transmitter coil 204, specifically, essentially in the manner of a short circuit ring that includes a turn, at the only break of which a first terminal 204.1 and a second terminal 204.2 are formed with a connection to an adaptation component 202, which is fed via the secondary coil 201 on rotor 200 inductively coupled to a primary coil 102 on the stator side.

Target 203 according to FIG. 7 has a three-fold rotational symmetry or rotation symmetry around rotational axis 500 between stator 100 and rotor 200 perpendicular to the drawing plane. Target 203 is formed by a sequence of alternatingly situated first and second sections 204.4 and 204.6 of winding 204.3 or turn of target 203. First and second sections 204.4 and 204.6 each extend essentially in the circumferential direction of the rotation symmetry at a fixed distance or radius from rotational axis 500, namely once at a greater distance for first sections 204.4 and once at a distance or radius located closer to axis 500 for second sections 204.6. Each first section 204.4 of winding or turn 204.3 of target 203 is electrically conductively connected on the input side and the output side, respectively, with a second section 204.6 of winding or turn 204.3 of target 203, in each case with the aid of radial section 204.5. Accordingly, each second section 204.6 of winding or turn 204.3 of target 203 is electrically conductively connected on the input side and the output side, respectively, with a first section 204.4 of winding or turn 204.3 of target 203, in each case with the aid of a radial section 204.5.

FIG. 7 also shows a rectifier 205, which functions as a voltage converter 303 or as part of a voltage converter 303 according to FIG. 2 and is coupled to another adaptation component 206, for example, a smoothing capacitor, in order to supply DC voltage components 304 of the LIDAR system.

First and second sections 204.4 and 204.6 span the full angle of 360°, specifically, which may be at identical angles α, α', as is depicted in conjunction with FIG. 8.

These features and additional features and properties of the present invention are explained further based on the following elucidations.

The present invention relates, in particular, to LIDAR systems 1 in the form of so-called LIDAR macroscanners, in which all required optical elements 304 and, in particular, a laser as light source 65-1 and a detector system 20 that includes a detector element 22 are seated on a rotor 200, but also LIDAR systems 1 in the manner of scanners, in which a mirror for beam deflection rotates and thus a visual field 50 and scene 53 with object 52 included therein are scanned.

In both cases, a beam of primary light 57 is emitted with a pulsed light source 65-1—for example, a laser—and the reflection thereof is detected as secondary light 58, in order to implement a distance measurement and to record an "image" of scene 53. The power supply of rotating systems 1 may be implemented wirelessly—for example, via a combination of primary coil 102 on the stator side and secondary coil 201 on the rotor side, whereas many conventional LIDAR systems operate with slip rings.

The rotor position must be known in order to commutate the motor and to calculate the scene image. A rotation angle sensor 5 is used for this purpose.

In this case, coupled coils are conventionally used for such a rotation angle sensor. An electromagnetic alternating field, which couples into multiple receiving coils of the conventional rotation angle sensor where in each case it induces a voltage, is formed in a field coil. The measurement of the rotation angle requires a rotatably mounted, conductive target, which influences the inductive coupling between the field coil and the receiving coils as a function of its angular position and relative to the receiving coils.

The exciter field specifically provides an induced voltage in the target structure resulting in a current flow, which in turn provides a magnetic field, which then induces voltages in the field coils. For reasons of electromagnetic capability, the field emission of the field coil is limited, which also results in a limited maximum distance between sensor board that has the coil structures and the target. The minimal distance may result in the exclusion of the concept in some implementations of the macroscanner.

An object of the present invention is to provide the integration of an inductive rotation angle sensor 5 into a wirelessly powered scanning optical system and, in particular, into a corresponding LIDAR system 1.

In so doing, target 203 of sensor 5 is directly energized, so that a field coil on sensor circuit board 103 is no longer necessary and greater distances between target 203 and receiving coils 103.1 and 103.2 of coil system 105 on the stator side are possible for the sensor element.

Thus, the core of the present invention is the integration of an inductive rotation angle sensor 5 into a wirelessly powered scanning optical system, in particular, of a LIDAR system 1. The wirelessly powered rotor 200 supplies target 203 of inductive rotation angle sensor 5 directly with power, so that an excitation on the side of stator 100 may be dispensed with, namely where receiving coils 103.1, 103.2 of coil system 105 on the stator side of rotation angle sensor 5 are placed.

The field coil or primary coil 102 for the inductive power transmission and for the rotation angle measurement is identical and is acted upon by a signal, which includes at least two frequency portions.

The following advantages, among others, result:

The measuring principle is independent of external magnetic fields which, for example, are generated by the stator coils of the motor (external magnetic field immunity).

An overall simple system 1 is formed.

Comparatively little additional hardware outlay is necessary.

The absolute position in connection with the uniqueness range of the sensor may already be known at the system start. This is important, in particular, for the motor commutation of the BLDC motor, specifically in synchronous machines.

The power transmission and the transmission of the sensor signals do not interfere with one another.

An overall easily implementable redundancy concept results, for example, according to ISO 26262, for rotation angle sensor 5, in particular, with the possibility of integrating additional receiving coils and without additional costs.

The concept according to the present invention is robustly tolerant and temperature-stable, i.e. thermal expansion does not result in measuring errors.

The overall result is a comparatively high measuring sensitivity or sensitivity of rotation angle sensor 5 according to the present invention.

The measuring principle provided according to the present invention is independent of many additional external influences, such as humidity, lubricants, etc.

A system according to the present invention as LIDAR system 1 including the required components is depicted in FIG. 2.

A rotor 200 is rotatably mounted about a rotational axis 500. Located opposite the rotor is a stator 100 assumed to be fixed.

Power is supplied to components 304 of LIDAR system 1 and additional components on rotor 200 via a primary coil 102, to which an AC voltage signal having a frequency range of several tens of kHz to several hundred kHz is applied by a generator 101, and to a secondary coil 201.

The AC voltage signal of generator 101 includes at least two frequency portions, of which—as previously stated—one first frequency is in the range of several tens to several hundred kHz and a second frequency is in the range of a few MHz (for example, 10 MHz). Although primary coil 102 is schematically depicted in FIG. 2 as a cylindrical coil, it may also be implemented as a toroidal coil or planar coil in circuit board technology, for example, on circuit board structure 103.

In order for a coil to be efficiently acted upon by a signal made up of two frequencies, a matching diplexer 106 is used, for example, which is described in greater detail in conjunction with FIG. 6.

Ferrite cores 301 and 302 may be used in order to ensure an effective power transmission.

Secondary coil 201 is connected on rotor 200 to a circuit component 202, for example, to a capacitance C1, and to target 203. This target must be configured to be electrically conductive in several areas. It may, for example, be a circuit board or else a milled part or punched part, for example, made of or including aluminum. Furthermore, it is also possible to structure ferrite element 302 accordingly, and to insert an electrically conductive element or at least to provide ferrite element 302 with an electrically conductive coating.

Circuit component 202 is to be dimensioned in such a way that it forms a short circuit for the second frequency in the range of a few MHz. If it is a capacitor, this circuit component should have an impedance of 1 Ohm at 10 MHz and/or a capacitance of approximately 15 nF.

The electromagnetic alternating field emitted by target 203 influences the inductive coupling between primary coil or field coil 103 and at least two receiving coils 103.1, 103.2, which are integrated on a circuit board structure 103. In addition to these components, the circuit board structure may also carry primary coil or field coil 102, as well as additional electrical components.

The basic structure of a receiving coil 103.1 is shown in FIG. 3.

Receiving coil 103.1 with its winding 103.3 includes surface areas of identical size, and an identical number of partial turns 103.4 and 103.5 in clockwise and counterclockwise rotation. A measuring range of 360° requires one partial turn 103.4, 103.5 each, a measuring range of 180° requires two each, a measuring range of 120° requires three each and so forth.

It should be noted that adjacent partial turns 103.4, 103.5 must always rotate in opposite directions.

At least two receiving coils 103.1 and 103.2 according to FIG. 4 may be used to enable a robust back-calculation into the rotation angle. These receiving coils must be rotated by a quarter of the measuring range toward one another. If three receiving coils are used, these receiving coils must be rotated by a third of the measuring range.

On the secondary side of rotor 200, the AC voltage may, for example, be rectified or further processed in another form using a voltage converter 303, for example, by smoothing or while smoothing, conversion to other frequencies, amplitudes and/or phases, in order to then supply additional components 304 of LIDAR system 1. These components are not further depicted here, but include at least light source 65-1, for example, a laser, and a detector system 20 that includes one or multiple detector elements 22.

Also not depicted are the required components for wireless data transmission between rotor 200 and stator 100, the motor for rotating rotor 200 as well as the requisite control unit.

According to the present invention, stator 100 includes, for example, a circuit board structure 103, which carries at least receiving coils 103.1 and 103.2 of coil system 105 of rotation angle sensor 5.

Ferrite element 301 on the stator side may either be situated below circuit board structure 103 as is depicted or else at least partially enclose this circuit board structure. It is also conceivable that circuit board structure 103 includes openings, via which ferrite element 301 on the stator side jacks at least partially through circuit board structure 103.

On the rotor side, system 1 according to the present invention includes a target 203 as a controllable exciter. This target 203 must be electrically conductively configured in several areas.

It may, for example, be a circuit board or else also a milled or punched part made of aluminum. Furthermore, it is also possible to structure ferrite element 302 on the rotor side accordingly and to insert an electrically conductive element or to at least provide ferrite element 302 with an electrically conductive coating.

It is crucial for the present invention that target 203 is actively electrically powered, i.e. is energized. According to the present invention, a voltage source, for example, in the form of a voltage converter 202—in particular, in the manner of a converter—is integrated for this purpose on the rotor side, which modulates the induced voltage of secondary coil 201 in frequency, optionally in amplitude and/or in phase. While the induced voltage of secondary coil 201 may include frequencies in the range of several 100 kHz, target 203 may be supplied with voltages having frequencies in the range of a few MHz—for example 5 MHz.

FIG. 3 shows a scheme of a receiving coil 103.1 on circuit board structure 103 having a measuring range of a total of 360°.

Receiving coil 103.1 includes surfaces of identical size and an identical number of partial turns or partial windings 103.4, 103.5 in clockwise and counterclockwise rotation. A measuring range of 360° requires one partial turn each, a measuring range of 180° requires two each and so forth. It should be noted that adjacent partial turns 103.4, 103.5 must always rotate in opposite directions.

At least two receiving coils 103.1 and 103.2 according to FIG. 4 may be used to enable a robust back-calculation into the rotation angle. These receiving coils must be rotated or are to be rotated by a quarter of the measuring range toward one another. If three receiving coils are used, these receiving coils must be rotated by a third of the measuring range.

FIG. 4 schematically shows the arrangement of two receiving coils 103.1, 103.2 on circuit board structure 103.

The two receiving coils 103.1, 103.2 depicted have an essentially identical geometry, but are depicted for reasons of clarity with slightly different diameters.

To demodulate the received signals, the carrier of the excitation signal of the target, namely the output signal of AC/AC converter 202, is reconstructed, for example, with the aid of known techniques of carrier recovery.

In-phase demodulation of the received signals with the excitation signal of target 203 results, for example, for two receiving coils according to FIG. 4, in signals of receiving coils 103.1 and 103.2, as they are depicted in tracks 73 and 74 of graph 70.

Target 203 may be geometrically configured in such a way that the amplitude of the received signals changes in a sinusoidal manner with the rotation angle, as shown in FIG. 5. For two receiving coils 103.1, 103.2, the above described rotation results in a sine/cosine system, which may be carried over into the rotation angle by division and arc tangent calculation.

Alternatively, other signal shapes having correspondingly different back-calculation algorithms are also possible, for example, having a linear amplitude curve as a function of the rotation angle.

Three advantageously configured receiving coils result in three signals electrically phase-shifted by 120°, which initially must be converted using the Clarke transformation into a two-phase system as in FIG. 5.

Situated in parallel to circuit component 202 is a rectifier circuit 205, for example, as part of a voltage converter 303 according to FIG. 2, which supplies all additional components 304 on rotor 200 with a DC voltage via an optional adaptation network 204, for example, a smoothing capacitor C2 having a capacitance between 1 µF and 100 µF.

These additional components 304 are not further depicted here, buy may include a light source 65-1, for example, a laser and a detector 22.

Also not depicted are the components required for wireless data transmission between rotor 200 and stator 100, the motor for rotating rotor 200, as well as the requisite control unit.

A matching diplexer or adaptation diplexer 106 may be used as an adaptation device in order to efficiently apply a signal, and, in particular, a feed signal made up of at least two frequencies to a coil and, in particular, primary coil 102.

This matching diplexer may include a topology according to FIG. 6. Lc and Rc represent the substitute elements of field coil 102. Port H marks the connection of the high-frequency signal to a second frequency in the range of a few MHz, port C marks the connection of the first frequency in the range of several tens to several hundred kHz.

For example, a dimensioning for a high frequency of 10 MHz (for the rotation angle measurement) and a low frequency of 100 kHz (for the power transmission) is depicted.

The combination of Ltrap and Ctrap must block a frequency of 10 MHz and allow a frequency of 100 kHz to pass. Ltrap should have an inductance in the range of around 1 pH in order to implement a sufficiently high quality and, therefore, a blocking effect.

Ctrap then results in 250 µF.

The isolation Liso may have have little influence for 10 MHz, i.e., should have a high inductance value.

A short-circuit would be optimal for the 100 kHZ path. A practical meaningful compromise is to equate the inductance Liso with the inductance of field coil 102, i.e. approximately 1 pH to 4 pH.

The additional elements of the circuit must be dimensioned as follows:

Ct left is to be dimensioned in such a way that a resonance frequency of 10 MHz is implemented with the parallel circuit made up of Liso and Lc, i.e. between approximately 50 µF and approximately 1 nF.

Ct right is to be dimensioned in such a way that a resonance frequency of 100 kHz is implemented with the series circuit made up of Liso and Lc, i.e. between approximately 1 nF and 500 nF.

Cm is generally to be measured in such a way that in the case of corresponding high and low frequencies, impedances in the range of $-5j\Omega$ result, for example, with Cm 3 nF and Cm right 300 nF.

FIG. 7 is a schematic diagram of a target 203 according to the present invention as a transmitter coil or transmitter coil 204, including the required components for supplying current on rotor 200.

FIG. 7 shows, in particular, secondary coil 201 on the rotor side, only one turn being depicted for reasons of clarity. The signal received by primary coil 102 via secondary coil 201 is converted via voltage converter 202 into an AC voltage of a different frequency, amplitude and/or phase, and directly supplies a target structure 203, in which a current flow consequently results.

Target structure 203, as depicted, may essentially be a short circuit ring. However, the target may include three or more turns in order to achieve a sufficiently high inductance. In principle, the adaptation of the impedance of target structure 203 to the impedance of converter 202 should be sought in order to achieve a maximum current flow. This current flow in turn ensures a maximum magnetic field and maximally induced voltages in receiving coils 103.1, 103.2 of stator 100.

Target 203 may be constructed according to FIG. 7 or FIG. 8 in such a way that in an angle range α, the current flow is concentrated on an outer circular arc element 204.4 of winding 204.3 of target 203, which has an outer radius and on a directly adjacent angle range α' the current flow takes place on an interior circular arc element 204.6. Between these are radially extending, conductive elements or sections 204.5, all of which intersect in their extensions in the point center of symmetry of rotational axis 500 of target structure 203. The sum of the two angle ranges α and α' equals the measuring range. It may also be provided that α=α' applies.

Alternatively, target element 203 may also include more complex structures on a circuit board. This may be a single layer, but also a multilayer circuit board.

What is claimed is:

1. A rotation angle sensor system for an optical system and/or a LIDAR system, which includes a rotor and a stator for determining a rotation angle and/or an orientation between the rotor and the stator, comprising:
   a coil system configured as a sensor element for receiving a magnetic alternating field, which is stator-based and rotatably fixedly attached or rotatably fixedly attachable to the stator; and
   a target for actively generating a magnetic alternating field, which is rotor-based and rotatably fixedly attached or rotatably fixedly attachable to the rotor;
   wherein the coil system and the target are attached or are attachable to the stator and to the rotor so that different overlaps and/or spatial proximities occur between the coil system and the target as a function of the rotation angle and/or of the orientation between the stator and the rotor with a correspondingly different influence of the magnetic alternating field of the target on the coil system; and
   wherein the rotation angle sensor is configured to actively energize the target for actively generating an magnetic alternating field, wherein a first voltage source is configured for supplying power to the target, including or in the manner of an adaptation network or adaptation component, which includes a capacitor connected in parallel, short-circuiting in a frequency range of 5 MHz to 20 MHz, having an impedance at 1 MHz of 1 Ohm, a capacitance of 15 nF and/or for adapting a frequency, amplitude and/or a phase of an input signal, and/or wherein the target is connected to or is connectable to such a voltage source and for which a connecting device is configured.

2. The rotation angle sensor system of claim 1, wherein the coil system of the sensor element or for the sensor element includes at least one coil element as a receiving coil, and wherein:
   a respective coil element is configured as a planar coil, and/or
   a respective coil element has a shape in cross section or in a plane of a coil winding having an even number of identical partial windings or partial turns adjacent to one another, with directly adjacent partial windings or partial turns rotating in the opposite direction, and/or
   a respective coil element having first and second terminals, and/or
   the coil system includes a plurality of coil elements and/or identically configured coil elements that are connected in series, rotated toward one another and/or uniformly cover a full angle, and/or
   the coil system is configured mirror-symmetrically and/or rotationally-symmetrically with respect to a rotational axis between stator and rotor.

3. The rotation angle sensor system of claim 1, wherein the target includes at least one of (i) a planar transmitter coil that includes terminals and one or multiple windings and/or one turn or multiple turns, in particular, in a plane in parallel to a plane defined by the coil element of the coil system of the receiving coil, and (ii) a short circuit ring.

4. The rotation angle sensor system of claim 1, wherein:
the target includes an equal number of first sections and second sections, each of which are configured to be identical to each other, overall identical, in an alternating sequence and/or uniformly covering a full angle, in particular, with respect to an underlying rotational axis, and/or
a respective first section of the target is configured for a current flow at a greater distance and/or along a greater radius with respect to a rotational axis between the stator and the rotor, and a respective second section of the target is configured for a current flow at a smaller distance and/or along a smaller radius with respect to the rotational axis, and/or
a respective first section of the target and a respective second section of the target are electrically connected on the input side and output side, in each case to second sections, and first sections preceding and following in the circumferential direction, relative to a rotational axis between the stator and the rotor, with the aid of connecting sections, which connect successive, radially extending or essentially radially extending first sections and second sections for a radial current flow in the circumferential direction, and/or
the target is mirror-symmetrically and/or rotationally-symmetrically configured with respect to a rotational axis between the stator and the rotor.

5. The rotation angle sensor system of claim 1, wherein the coil system of the sensor element and the target are attached or are attachable to the stator and to the rotor so that the coil system and the target are situated in planes in parallel with one another and/or are situated a minimal distance apart from one another, at a distance of less than 5 mm.

6. The rotation angle sensor system of claim 1, wherein the coil system for the sensor element is configured as a circuit board structure or as part of a circuit board structure on the stator side, and/or wherein the target is configured as a circuit board structure or as part of a circuit board structure on the rotor side.

7. The rotation angle sensor system of claim 1, wherein the coil system of the sensor element and the target are attached or are attachable to the stator and to the rotor so that the coil system and the target are situated in planes in parallel with one another and/or are situated a minimal distance apart from one another, at a distance of less than 2 mm.

8. The rotation angle sensor system of claim 1, wherein the coil system of the sensor element and the target are attached or are attachable to the stator and to the rotor so that the coil system and the target are situated in planes in parallel with one another and/or are situated a minimal distance apart from one another, at a distance of under 1 mm.

9. A LIDAR system for visually detecting a visual field, for a work device and/or for a vehicle, comprising:
a rotor;
a stator; and
a drive, for rotating the rotor relative to the stator about a rotational axis and including a rotation angle sensor system for determining a rotation angle and/or an orientation between the rotor and the stator, wherein the coil system is rotatably fixedly attached to the stator and the target is rotatably fixedly attached to the rotor;
wherein the rotation angle sensor system includes:

a coil system configured as a sensor element for receiving a magnetic alternating field, which is stator-based and rotatably fixedly attached or rotatably fixedly attachable to the stator; and
a target for actively generating a magnetic alternating field, which is rotor-based and rotatably fixedly attached or rotatably fixedly attachable to the rotor, wherein the coil system and the target are attached or are attachable to the stator and to the rotor so that different overlaps and/or spatial proximities occur between the coil system and the target as a function of the rotation angle and/or of the orientation between the stator and the rotor with a correspondingly different influence of the magnetic alternating field of the target on the coil system;
wherein the rotor and/or a transmitter optical system includes a light source unit encompassed by the rotor and/or a receiver optical system that includes a detector system are configured for wirelessly supplying power, in particular, with the aid of induction, and
the stator includes a primary coil configured for generating and emitting an magnetic alternating field and the rotor includes a secondary coil for receiving the magnetic alternating field of the primary coil and for generating an induction voltage as an operating voltage, magnetically coupled to one another, in particular, each magnetically coupled to a ferrite element.

10. The LIDAR system of claim 9, wherein a ferrite element of the primary coil on the stator side is formed below the coil system for the sensor element or the primary coil on the stator side and/or its carrier is configured to be partially perforated and/or at least partially enclose a ferrite element of the primary coil on the stator side, and/or wherein a ferrite element of the secondary coil on the rotor side is structured to accommodate the target in a recess, and/or includes a materially modified area as target, in particular, in the form of an implantation and/or a coating.

11. The LIDAR system of claim 9, wherein the rotor includes at least one of:
a first voltage source for supplying power to the target, including an adaptation network or an adaptation component, which includes a capacitor connected in parallel, short-circuiting in a frequency range of 5 MHz to 20 MHz, having an impedance at 1 MHz of 1 Ohm, a capacitance of 15 nF, for adapting frequency, amplitude and/or phase of an input signal and/or electromagnetically coupled to the secondary coil on the rotor side for supplying power, and/or
a second voltage source for supplying power to the rotor, to a drive of the rotor, to a transmitter optical system including a light source unit encompassed by the rotor and/or to a receiver optical system including a detector system, the second voltage source including a rectifier and/or a second adaptation network, including a smoothing capacitor, which has a capacitance in the range of 1 µF to 100 µF, and/or is electromagnetically coupled to the secondary coil on the rotor side for supplying power.

12. The LIDAR system of claim 9, wherein a generator is configured for supplying power for feeding the primary coil in the stator, together with an adaptation diplexer, and/or for generating or feeding a supply signal of (i) a first component in the range of 10 kHz to 500 kHz for supplying additional components of the rotor besides the target, and of (ii) a second component in the range of 5 MHz to 20 MHz for supplying the target.

13. An operating method for a LIDAR system, the method comprising:

converting a supply signal, wirelessly received in a rotor, in amplitude, frequency and/or phase using at least one of:

a first adaptation network or adaptation component, with a capacitor, connected in parallel, short-circuiting in a frequency range of 5 MHz to 20 MHz, having an impedance at 1 MHZ of 1 Ohm, a capacitance of 15 nF, to operate the target of the rotation angle sensor and to excite the transmitter coils of the target, and/or a rectifier and/or a second adaptation network, which includes a smoothing capacitor, having a capacitance in the range of 1 µF to 100 µF, to operate additional components of the LIDAR system in the rotor, a drive of the rotor, a transmitter optical system encompassed by the rotor that includes a light source unit and/or a receiver optical system that includes a detector system;

wherein the LIDAR system includes the rotor and a stator for determining a rotation angle and/or an orientation between the rotor and the stator, including:

a coil system configured as a sensor element for receiving a magnetic alternating field, which is stator-based and rotatably fixedly attached or rotatably fixedly attachable to the stator; and a target for actively generating a magnetic alternating field, which is rotor-based and rotatably fixedly attached or rotatably fixedly attachable to the rotor;

wherein the coil system and the target are attached or are attachable to the stator and to the rotor so that different overlaps and/or spatial proximities occur between the coil system and the target as a function of the rotation angle and/or of the orientation between the stator and the rotor with a correspondingly different influence of the magnetic alternating field of the target on the coil system, and wherein the coil system for the sensor element is configured as a circuit board structure or as part of a circuit board structure on the stator side, and/or the target is configured as a circuit board structure or as part of a circuit board structure on the rotor side.

14. The operating method of claim 13, wherein the supply signal includes at least one of: (i) a first component in the range of 10 kHz to 500 kHz for supplying additional components of the rotor besides the target, and/or (ii) a second component in the range of 5 MHz to 20 MHz for supplying the target is generated for the purpose of supplying power, for feeding the primary coil, and supplied via a generator, together with an adaptation diplexer in the stator.

* * * * *